Patented Dec. 12, 1922.

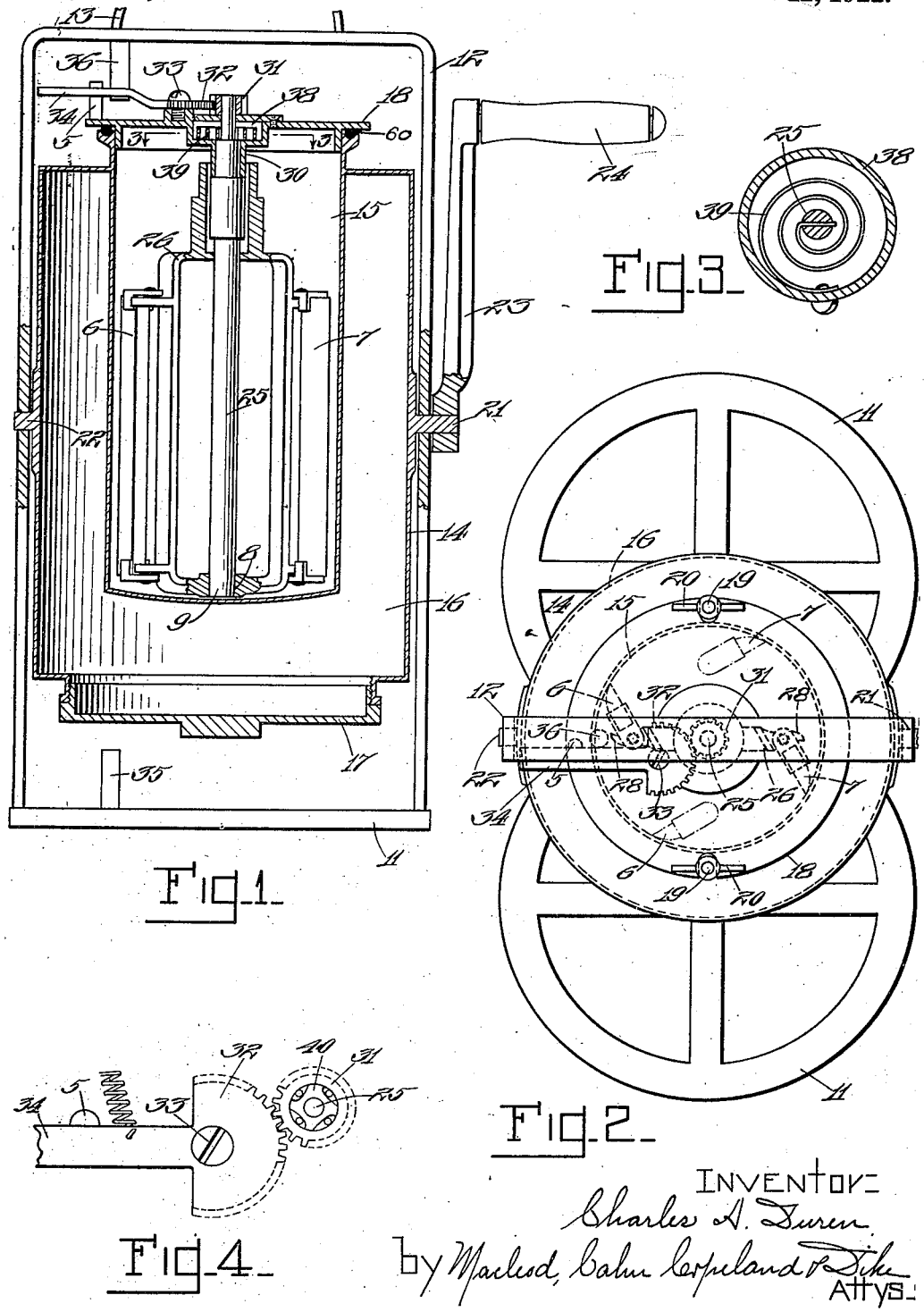

1,438,523

UNITED STATES PATENT OFFICE.

CHARLES A. DUREN, OF BOSTON, MASSACHUSETTS, ASSIGNOR OF ONE-HALF TO HENRY P. ROBERTS, OF BOSTON, MASSACHUSETTS.

ICE-CREAM FREEZER.

Application filed February 21, 1922. Serial No. 538,194.

*To all whom it may concern:*

Be it known that I, CHARLES A. DUREN, a citizen of the United States, residing at Boston, county of Suffolk, State of Massachusetts, have invented a certain new and useful Improvement in Ice-Cream Freezers, of which the following is a specification, reference being had therein to the accompanying drawings.

My invention relates to ice cream freezers, the particular object being to provide a device of this character which shall be so constructed as to exclude absolutely all of the brine from the mixture; also constructed that it can be operated easily and quickly and kept well oiled and in proper condition without danger of contaminating the mixture which is being frozen.

The invention will be fully understood from the following description when taken in connection with the accompanying drawings, and the novel features thereof will be pointed out and clearly defined in the claims at the close of this specification.

In the drawings, Figure 1 is a sectional elevation of an ice cream freezer embodying my invention.

Figure 2 is a top plan view of the freezer shown in Fig. 1.

Figure 3 is a section on line 3, 3 of Fig. 1.

Figure 4 is a detail view showing a modification.

Referring now to the drawings, at 11 is shown the base which is conveniently of some ornamental shape having a relatively large area so that the freezer will stand firmly. At 12 is shown a U-shaped standard having a handle 13 partly broken away at the top. In this standard is mounted a double container 14 having an interior chamber 15 within which is received the mixture to be frozen, the freezing mixture being placed in the chamber 16. The openings to the two chambers are at opposite ends of the container, the cover 17 being removed for the introduction of the freezing mixture, while the cover 18, which is secured in place by bolts 19 and wing nuts 20, is removable for the introduction of the mixture to be frozen. The container as a whole is mounted on trunnions 21 and 22, engaging the standard 12 of the machine, and one of said trunnions 21 is provided with a crank arm 23 and handle 24. By this means, the container as a whole may be rotated about an axis transverse to its length, and the contents of both chambers can be thoroughly agitated. This is a distinct advantage, as the agitation of the freezing mixture intensifies the cooling effect produced by the melting of the ice, while the agitation of the contents of the inner chamber tends to transmit the heat from the freezing mixture to the ice cream more rapidly.

To scrape the frozen cream from the interior surface of the chamber 15 so as to prevent the formation of an insulating thickness and also for the purpose of rendering the frozen product smooth and homogeneous, I provide a beater or scraper and automatic mechanism for operating it, which will now be described.

At 25 is shown a beater shaft. On this shaft is mounted a frame 26 bearing pivoted paddles 6, 7. These paddles are preferably of wood with sharp edges, as shown in Figure 2, and are free to swing, except as prevented by the stop 28. This construction of paddle is not novel, being already well known in this art. The frame 26 which is mounted on the shaft 25 is provided with a socket 8 which has a taper fit with a portion 9 on the shaft 25 so that when the paddle is in place on the shaft, it will be driven by it. The upper end of the shaft extends through a bearing 30 in the cover 18 and carries on its upper end a pinion 31. This pinion 31 meshes with a gear sector 32 pivoted at 33 to the cover 18. The gear sector 32 carries a handle 34 which projects laterally as far as permitted by the standard 12. The handle 34 normally rests against a pin 5 which projects upwardly from the cover 18. On the base 11, as shown at 35, and on the crossbar of the standard 12, as shown at 36, are two pins located in the path of the handle 34 against which it strikes as the freezer is revolved.

Surrounding the shaft 25 and enclosed within the casing 38 secured to the cover plate 18 is a clock spring 39, one end of which is secured to the shaft 25, the other end being secured to the casing as shown in Figure 3.

In operating the machine embodying my invention, the mixture to be frozen is placed within the chamber 15 and the cover 18 secured in place by the wing nuts and bolts. A gasket 60 is used to make a tight joint and to seal the casing. The freezing mixture is placed in the chamber 16 and the cover 17 screwed into place. Thereafter, the operator revolves the container by the handle 24, holding the freezer at the same time by the handle 13. As the container revolves, the handle 34 on the gear sector 32 strikes first the pin 36 and then the pin 35. When the handle 34 contacts with one of these pins as, for instance, the pin 36, the continued movement of the container causes the handle 34 to swing on its pivot, rotating the shaft 25 and the paddle frame 26 and causing the paddles 6, 7 to scrape the frozen mixture from the interior of the chamber 15. As soon as the rotation of the container has carried the gear sector handle 34 past the pin 36, the spring 39 throws the gear sector and actuated parts back into their original position ready to contact with the other pin 35. The paddle is easily retracted by means of the spring 39 because the paddle members 6, 7 swing on their pivots and drag back without doing any substantial amount of work.

From the foregoing it will be seen that at each revolution of the container, the paddles are given substantially two complete oscillations so that the entire wall of the container within the range of the paddles is completely cleared of the frozen mixture. It will be understood of course that the sector 32 is properly designed with relation to the pinion 31 so that at each stroke each paddle will travel along the wall of the container far enough to pass the point which was occupied by the next paddle at the beginning of the stroke, thus ensuring that the entire surface of the wall of the container is acted on by one paddle or the other at each stroke.

In Figure 4, I have shown a modified form of a device embodying my invention. In this device, there is a small roller or ball clutch 40 connecting the shaft 25 with the pinion 31. This construction makes it possible to rotate the paddle frame in one direction by an intermittent motion, and does away with the spring, the paddle frame being given a positive movement in one direction.

What I claim is—

1. An improved ice cream freezer comprising a closed double container one of said containers being inside of the other and of less diameter so as to form a chamber for the outer container surrounding the inner container, a paddle within the inner container, means for rotating the container about an axis transverse to its longitudinal axis and means for oscillating said paddle about the longitudinal axis during the rotation of the container on the said first axis.

2. An improved ice cream freezer comprising a closed double container one of said containers being inside of the other and of less diameter so as to form a chamber between the walls of the inner and outer container, a paddle mounted within said inner container, means for rotating said double container about an axis at right angles to its main axis, and means whereby during the rotation of said double container the said paddle is caused to oscillate on the main axis.

3. An improved ice cream freezer comprising a frame, a cylindrical container comprising two concentric chambers open at opposite ends, a paddle within the inner container and means actuated by contact with a fixed member on the frame to give the paddle movement about the main axis of the container.

4. An improved ice cream freezer comprising a frame, a cylindrical container having two concentric chambers therein, open at opposite ends, covers for said chambers, a paddle within the inner chamber mounted on the cover thereof and means actuated by contact with a fixed member on the frame to give the paddle movement about the main axis of the container.

5. An improved ice cream freezer comprising a frame, a closed double container rotatable about an axis at right angles to its main axis, a paddle within the container and means actuated by contact with a fixed member on the frame to oscillate the paddle about the main axis of the container.

6. An improved ice cream freezer comprising a frame, a closed double container rotatable about an axis at right angles to its main axis, a paddle within the container, a shaft therefor, a pinion on the shaft, a gear sector engaging said pinion, said gear sector having a handle, and there being a fixed member on the frame located in the path of the handle so that the paddle will be oscillated by the handle when it contacts with the fixed member on the frame.

7. An improved ice cream freezer comprising a frame, a closed double container rotatable about an axis at right angles to its main axis, a paddle within the container having pivoted blades, means actuated by contact with a fixed member on the frame to give the paddle an oscillating movement about the main axis of the container and a spring to return the paddle to its original position.

8. An improved ice cream freezer comprising a frame, a closed double container rotatable about an axis at right angles to its main axis, a cover for said container, a paddle, a shaft carrying the paddle rotatable in a bearing in the cover, a pinion on the shaft, a gear sector engaging said pinion and having a handle arranged for contact with a fixed member on the frame to give the paddle movement about the main axis of the G. A. FELLMANN AND J. L. SINNING.
CABINET FOR HOLDING PHONOGRAPH RECORDS AND SIMILAR ARTICLES.
APPLICATION FILED APR. 26, 1920.
1,438,524.
Patented Dec. 12, 1922.
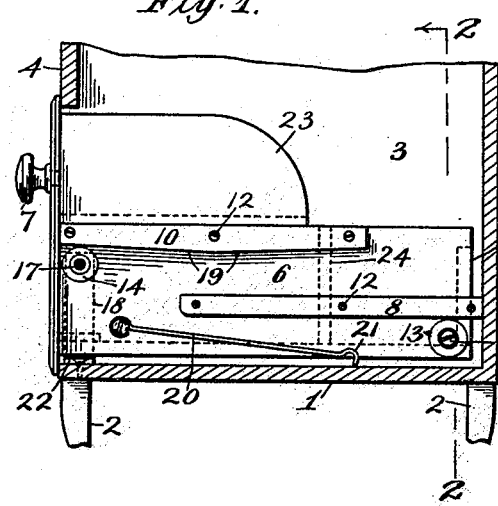
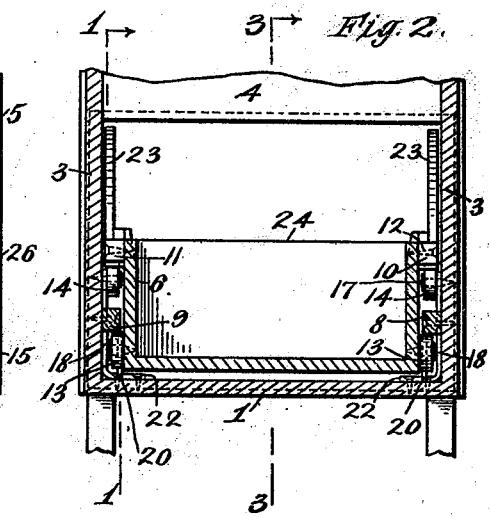
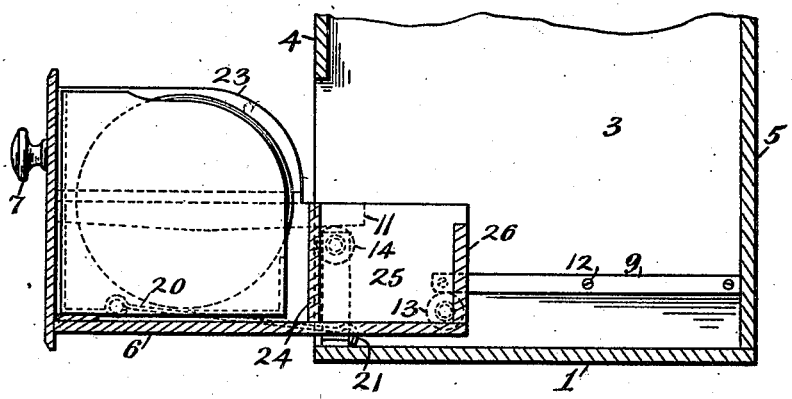
INVENTORS
Gustav A Fellmann
BY John L Sinning
ATTORNEYS